United States Patent
Horiguchi et al.

(10) Patent No.: US 8,018,565 B2
(45) Date of Patent: Sep. 13, 2011

(54) HORIZONTAL ELECTRIC FIELD-TYPE LIQUID CRYSTAL DISPLAY PANEL

(75) Inventors: Masahiro Horiguchi, Tottori (JP); Hideki Kaneko, Tottori (JP)

(73) Assignee: Sony Corporation, Tokyo (JP)

(*) Notice: Subject to any disclaimer, the term of this patent is extended or adjusted under 35 U.S.C. 154(b) by 820 days.

(21) Appl. No.: 12/103,156

(22) Filed: Apr. 15, 2008

(65) Prior Publication Data

US 2009/0002294 A1    Jan. 1, 2009

(30) Foreign Application Priority Data

Jun. 28, 2007   (JP) ................... 2007-170074

(51) Int. Cl.
  *G02F 1/1343*   (2006.01)
  *G09G 3/36*    (2006.01)
(52) U.S. Cl. ........ 349/141; 349/138; 349/139; 349/140; 349/143; 349/147; 345/87
(58) Field of Classification Search ............... 349/141, 349/42, 43, 138, 139, 140, 143, 147; 345/87
  See application file for complete search history.

(56) References Cited

U.S. PATENT DOCUMENTS

| | | | | |
|---|---|---|---|---|
| 5,786,876 A | * | 7/1998 | Ota et al. .................. | 349/42 |
| 6,563,561 B1 | * | 5/2003 | Ota et al. .................. | 349/141 |
| 6,980,273 B2 | * | 12/2005 | Ota et al. .................. | 349/141 |
| 7,190,429 B2 | * | 3/2007 | Yoshida et al. ........... | 349/141 |
| 2003/0002001 A1 | * | 1/2003 | Ota et al. .................. | 349/141 |
| 2005/0190316 A1 | | 9/2005 | Takahashi et al. ......... | 349/44 |
| 2009/0002294 A1 | * | 1/2009 | Horiguchi et al. ......... | 345/87 |
| 2009/0096946 A1 | * | 4/2009 | Harada .................... | 349/38 |

FOREIGN PATENT DOCUMENTS

| | | |
|---|---|---|
| JP | 10-319371 | 12/1998 |
| JP | 2002-014363 | 1/2002 |
| JP | 2002-131767 | 5/2002 |
| JP | 2002-244158 | 8/2002 |
| JP | 2005-241923 | 9/2005 |

\* cited by examiner

*Primary Examiner* — Brian M Healy
(74) *Attorney, Agent, or Firm* — K&L Gates LLP

(57) ABSTRACT

A horizontal electric field-type liquid crystal display panel includes a plurality of scanning lines that are disposed parallel to each other, a common wiring, a plurality of signal lines that are disposed in a direction for intersecting the plurality of scanning lines, a switching element that is disposed near an intersection between the scanning line and the signal line, a first electrode formed in an area partitioned by the scanning line and the signal line, and a second electrode that is formed to be overlapped with the first electrode though an insulation film disposed on the first electrode and has a plurality of slits in the shape of a stripe. A shield electrode formed of a conductive material is formed on the surface of the insulation film disposed on the scanning line, and the shield electrode is connected to the common wiring through a contact hole formed on the common wiring.

6 Claims, 13 Drawing Sheets

HORIZONTAL ELECTRIC FIELD-TYPE LIQUID CRYSTAL DISPLAY PANEL

BACKGROUND

1. Technical Field

The present invention relates to a liquid crystal display panel of a horizontal electric field-type such as a fringe field switching (hereinafter, referred to as "FFS") mode, and more particularly, to a horizontal electric field-type liquid crystal display panel having a unit for preventing burn-in due to a voltage applied to scanning lines.

2. Related Art

As liquid crystal display panels, although liquid crystal display panels of a vertical electric field-type such as a TN (twisted nematic) mode, a VA (vertical alignment) mode, or an MVA (multi-domain vertical alignment) mode are widely used, horizontal electric field-type liquid crystal display panels in which electrodes are included in one substrate only are also known. Among the horizontal electric field-type liquid crystal display panels, the operating principle of a liquid crystal display panel of an IPS (in-plane switching) mode will be described with reference to FIGS. 9 to 11 (see JP-A-10-319371 (Paragraphs [0005], [0053], and [0065] to [0077], and FIGS. 2, 5, and 6) and JP-A-2002-131767 (Claims, Paragraphs [0006] to [0009], and [0018] to [0077], and FIGS. 1 and 3)).

FIG. 9 is a schematic plan view of one pixel of a general liquid crystal display panel of the IPS mode as an example. FIG. 10 is a cross-sectional view of FIG. 9 taken along line X-X. FIG. 11 is a cross-sectional view of FIG. 9 taken along line XI-XI.

The liquid crystal display panel 50 of the IPS mode includes an array substrate AR and a color filter substrate CF. In the array substrate AR, a plurality of scanning lines 52 and common wirings 53 are disposed to be parallel to the surface of a first transparent substrate 51. In addition, a plurality of signal lines 54 are disposed in a direction for intersecting the scan lines 52 and the common wiring 53. In a center portion of each pixel, an opposing electrode (also referred to as a common electrode) 55, for example, having a comb shape as shown in FIG. 9 is disposed in a strip shape extending from the common wiring 53, and a comb-shaped pixel electrode 56 is disposed so as to interpose peripherals of the opposing electrode 55 therebetween. The surfaces of the opposing electrode 55 and the pixel electrode 56 are coated with a protection insulation film 57, for example, formed of silicon nitride and an alignment film 58 formed of polyimide or the like.

In addition, around intersections between the scanning lines 52 and the signal lines 54, TFTs (thin film transistors) as switching elements are formed. In the TFT, a semiconductor layer 59 is disposed between the scanning line 52 and the signal line 54, a signal line portion on the semiconductor layer 59 forms a source electrode S of the TFT, a scanning line 12 portion of the lower part of the semiconductor layer 59 forms a gate electrode G, and a conductive layer that is overlapped with a part of the semiconductor layer 59 forms a drain electrode D, and the drain electrode D is connected to the pixel electrode 56.

The color filter substrate CF has a configuration in which a color filter layer 61, an overcoat layer 62, and an alignment film 63 are disposed on the surface of a second transparent substrate 60. The array substrate AR and the color filter substrate CF are disposed to face each other such that the pixel electrode 56 and the opposing electrode 55 of the array substrate AR and the color filter layer 61 side of the color filter substrate CF are disposed so as to face each other. Next, a liquid crystal LC is sealed between the array substrate AR and the color filter substrate CF, and polarizing plates 64 and 65 are disposed on outer sides of both the substrates such that polarizing directions thereof intersect each other, and thereby the IPS-mode liquid crystal display panel 50 is formed.

In the IPS-mode liquid crystal display panel 50, as shown in FIGS. 10 and 11, when an electric field is formed between the pixel electrode 56 and the opposing electrode 55, the liquid crystal that has been aligned horizontally rotates in a horizontal direction, whereby the amount of transmission of light incident from a back light can be controlled. Although the IPS-mode liquid crystal display panel 50 has advantages that it has a wide viewing angle and high contrast, the opposing electrode 55 is formed of a same metal material as those of the common wiring 53 and the scanning line 52, and accordingly, there are problems that the liquid crystal display panel has a low aperture ratio and low transmittance and has a change in a display color depending on the viewing angle.

In order to solve the problems of the low aperture ratio and low transmittance in the above-described IPS-mode liquid crystal display panel, FFS-mode liquid crystal display panels have been developed (see JP-A-2002-14363 (Claims, Paragraphs [0002] to [0010] and [0019] to [0026], and FIGS. 1 and 2) and JP-A-2002-244158 (Claims, Paragraphs [0002] to [0013] and [0023] to [0032] and FIGS. 1 to 4)). The operating principle of the FFS-mode liquid crystal display panel will be described with reference to FIGS. 12 to 15.

FIG. 12 is a schematic plan view of one pixel of a general liquid crystal display panel of the FFS mode as an example. FIG. 13 is a cross-sectional view of FIG. 12 taken along line XIII-XIII. FIG. 14 is a cross-sectional view of FIG. 12 taken along line XIV-XIV. FIG. 15 is a schematic plan view of one pixel of an FFS-mode liquid crystal display panel having a structure in which slits of pixel electrodes are tilted.

The liquid crystal display panel 70A of the FFS mode includes an array substrate AR and a color filter substrate CF. In the array substrate AR, a plurality of scanning lines 72 and common wirings 73 are disposed to be parallel to the surface of a first transparent substrate 71. In addition, a plurality of signal lines 74 are disposed in a direction for intersecting the scan lines 72 and the common wiring 73. In addition, a common electrode (also referred to as an opposing electrode) 75 formed of a transparent material including ITO (indium tin oxide), IZO (indium zinc oxide), or the like which is connected to the common wiring 73 for covering areas partitioned by the scanning lines 72 and the signal lines 74 is disposed. In addition, pixel electrodes 78A formed of a transparent material such as ITO in which a plurality of slits 77A in the shape of stripes is formed are disposed on the surface of the common electrode 75 through an insulation film 76. The surfaces of the pixel electrodes 78A and a plurality of slit 77A portions are coated with an alignment film 80.

In addition, around intersections between the scanning lines 72 and the signal lines 74, TFTs (thin film transistors) as switching elements are formed. In the TFT, a semiconductor layer 79 is disposed on the surface of the scanning line 72, a part of the signal line 74 extends so as to cover a part of the surface of the semiconductor layer 79, and thereby a source electrode S is formed. In addition, a scanning line portion of the lower part of the semiconductor layer 79 forms a gate electrode G, and a conductive layer that is overlapped with a part of the semiconductor layer 79 forms a drain electrode D. The drain electrode D is connected to the pixel electrode 78A.

The color filter substrate CF has a configuration in which a color filter layer 83, an overcoat layer 84, and an alignment film 85 are disposed on the surface of a second transparent substrate 82. The array substrate AR and the color filter substrate CF are disposed to face each other such that the pixel electrode 78A and the common electrode 75 of the array substrate AR and the color filter layer 83 of the color filter substrate CF are disposed so as to face each other. Next, a liquid crystal LC is sealed between the array substrate AR and the color filter substrate, and polarizing plates 86 and 87 are disposed on outer sides of both the substrates such that polarizing directions thereof are perpendicular to each other, and thereby the FFS-mode liquid crystal display panel 70A is formed.

In the FFS-mode liquid crystal display panel 70A, when an electric field is formed between the pixel electrode 78A and the common electrode 75, as shown in FIGS. 13 and 14, the electric field is in a direction toward the common electrode 75 from both sides of the pixel electrode 78A. Accordingly, not only liquid crystal molecules in the slits 77A, but also liquid crystal molecules on the pixel electrode 78A can be moved. Since the FFS-mode liquid crystal display panel 70A has a wider viewing angle, higher contrast, and higher transmittance than the IPS-mode liquid crystal display panel 50, bright display can be achieved. In addition, since the FFS-mode liquid crystal display panel 70A has an overlapped area between the pixel electrode 78A and the common electrode 75 in a plan view larger than that of the IPS mode liquid crystal display panel 50, a larger holding capacitance is secondarily formed, and accordingly, there is an additional advantage that an additional auxiliary capacitance line is not needed to be disposed in the FFS-mode liquid crystal display panel 70A.

In the FFS-mode liquid crystal display panel, it is preferable that the rubbing direction is perpendicular to the signal line and the pixel electrode and the rubbing direction forms a tilt of a minute angle, in consideration of the display characteristic thereof. Accordingly, as in the FFS-mode liquid crystal display panel 70B shown in FIG. 15, a configuration in which the slits 77B having a stripe shape disposed in the pixel electrode 78B are tilted with respect to the scanning line 72 and the common wiring 73 is used. In addition, since the only difference between the FFS-mode liquid crystal display panel 70B shown in FIG. 15 and the FFS-mode liquid crystal display panel 70A shown in FIG. 12 is the tilted angle of the slits 77B disposed in the pixel electrode 78B, a same reference numeral is assigned to a constituent part that is the same as that of the FFS-mode liquid crystal display panel 70A shown in FIG. 12, and a detailed description thereof is omitted here.

As described above, since the FFS-mode liquid crystal display panel has a wider viewing angle, higher contrast, and higher transmittance than the IPS-mode liquid crystal display panel, bright display can be achieved. In addition, the FFS-mode liquid crystal display panel can be driven at a low voltage level and can have an excellent display quality without disposing an additional capacitance line owing to secondary formation of large holding capacitance.

However, it is known that a burn-in phenomenon occurs in a case where a liquid crystal display panel is used for a long time. Such a burn-in phenomenon occurs in both the IPS-mode liquid crystal display panel and the FFS-mode liquid crystal display panel. However, it has been found that the burn-in phenomenon occurs more severely in the above-described general FFS-mode liquid crystal display panel than the general IPS-mode liquid crystal display panel. According to various experiments performed by inventors, the difference between the degrees of the burn-in phenomena in the FFS-mode and the IPS-mode is estimated to be caused by asymmetry of the path of electric flux lines from the pixel electrode toward the liquid crystal and the path of electric flux lines from the liquid crystal toward the scanning line in the FFS-mode liquid crystal display panel while the paths of the electric flux lines are symmetrical to each other in the IPS-mode liquid crystal display panel.

In other words, in the IPS-mode liquid crystal display panel and the FFS-mode liquid crystal display panel, a voltage level applied to the scanning line in a non-section state of a specific pixel is, for example, about −10 V, and a voltage level applied to the scanning line in a selection state of a specific pixel is about +15 V. However, since a period during which a specific pixel is selected is very short, a DC voltage of about −10 V is applied to the scanning line for a long time. In addition, in the IPS-mode liquid crystal display panel, as clearly shown in FIG. 11, the electric flux lines E1 from the pixel electrode 56 toward the scanning line 52 enter into the liquid crystal layer LC through the pixel electrode 56, the protection insulation film 57, and the alignment film 58, and reach the scanning line 52 through the alignment film 58 and the protection insulation film 57 from the liquid crystal layer LC. In other words, in the IPS-mode liquid crystal display panel, the path of the electric flux lines from the pixel electrode 56 to the liquid crystal layer LC and the path of the electric flux lines from the liquid crystal layer LC to the scanning line 52 are symmetrical to each other.

On the other hand, in the FFS-mode liquid crystal display panel, as clearly shown in FIG. 14, the electric flux lines E2 from the pixel electrode 78A toward the scanning line 72 enter into the liquid crystal layer LC through the alignment film 80 from the pixel electrode 78A, and reach the scanning line 72 though the alignment film 80 and the insulation film 76 from the liquid crystal layer LC. In other words, in the FFS-mode liquid crystal display panel, the path of the electric flux lines from the pixel electrode 78A to the liquid crystal layer LC and the path of the electric flux lines from the liquid crystal layer LC to the scanning line 72 are asymmetrical to each other. Accordingly, in the FFS-mode liquid crystal display panel, the pixel electrode 78A and the alignment film 80 disposed on the surface thereof are easily influenced by a DC electric field due to a signal applied to the scanning line 72 irreversibly more than in the IPS-mode liquid crystal display panel, and it is estimated to cause the severe burn-in phenomenon.

It is difficult to configure the path of electric flux lines from the pixel electrode to the liquid crystal layer and the path of electric flux lines from the liquid crystal layer to the scanning line symmetrical to each other for reducing the burn-in problem of the above-described FFS-mode liquid crystal display panel, when the operating principle of the FFS-mode liquid crystal display panel is considered. However, inventors have found a method of reducing the burn-in phenomenon of the FFS-mode liquid crystal display panel by preventing application of the DC electric field on the basis of a high-voltage signal applied to the scanning line to liquid crystals nearby, and the invention has been accomplished.

In addition, in JP-A-2002-131767, in the IPS-mode liquid crystal display panel, an example in which a conduction layer partially overlapped with one between the signal line and the scanning line is disposed for preventing light leakage due to a liquid crystal driven by an electric field generated between the signal line (drain signal line) or the scanning line (gate signal line) and an adjacently disposed electrode is disclosed. In addition, a description partially implying an FFS-mode liquid crystal display panel is made therein (see Paragraphs [0003] to [0004]). However, in JP-A-2002-131767, a detailed example of the FFS-mode liquid crystal display panel is not described, and there is no description for implying the problem of burn-in in the IPS-mode liquid crystal display panel and the FFS-mode liquid crystal display panel.

SUMMARY

An advantage of some aspects of the invention is that it provides a horizontal electric field-type liquid crystal display panel such as an FFS-mode liquid crystal display panel having a unit for preventing burn-in due to voltage applied to a scan line.

According to a first aspect of the invention, there is provided a horizontal electric field-type liquid crystal display panel including: a plurality of scanning lines and common wirings that are disposed parallel to each other; a plurality of signal lines that are disposed in a direction for intersecting the plurality of scanning lines; a switching element that is disposed near an intersection between the scanning line and the signal line; a first electrode formed in an area partitioned by the scanning line and the signal line; and a second electrode that are formed to be overlapped with the first electrode though an insulation film disposed on the first electrode and have a plurality of slits in the shape of a stripe. In the horizontal electric field-type liquid crystal display panel, a shield electrode formed of a conductive material is formed on the surface of the insulation film disposed on the scanning line, and the shield electrodes is connected to the common wiring through a contact hole formed on the common wiring.

According to the horizontal electric field-type liquid crystal display panel of the above-described aspect of the invention, since the shield electrode formed of a conductive material is formed on the surface of the insulation film disposed on the scanning line, a high-voltage signal applied to the scanning line is shielded by the shield electrode. Accordingly, in the horizontal electric field-type liquid crystal display panel, since a DC component is not applied to a liquid crystal located above the shield electrode, contrast is improved. In addition, since the second electrode and the alignment film disposed on the surface thereof are not influenced by an irreversible effect caused by a DC electric field from the scanning line, a burn-in phenomenon is reduced markedly. In addition, since the shield electrode is connected to the common wiring though a contact hole formed on the common wiring, and the contact hole can be formed simultaneously with a contact hole for connecting the switching element to the first electrode and the second electrode, man-hour for forming a contact hole particularly for the shield electrode does not increase. The shield electrode and the second electrode may be formed of a same material or different materials.

According to a second aspect of the invention, in the above-described horizontal electric field-type liquid crystal display panel, the first electrodes is connected to the common wiring, the second electrode is connected to the switching element though a first contact hole formed on an electrode of the switching element, and the shield electrode is connected to the common wiring through a second contact hole formed on the common wiring.

In the horizontal electric field-type liquid crystal display panel, the first electrode forms a common electrode and the second electrode forms a pixel electrode. According to the horizontal electric field-type liquid crystal display panel, the shield electrode and the first electrode can be connected together by using a simple configuration. In addition, for applying voltage applied to the common wiring to the shield electrode, when the common wiring is connected to the shield electrode through a contact hole formed on the common wiring, an area within one pixel can be effectively used, compared to a case where the common electrode is connected to the shield electrode only through an area of the first electrode connected to the common wiring. Therefore, a larger display area can be acquired. In addition, the contact hole is formed on the common wiring not directly relating to the original display, and accordingly, even when there is disturbance in alignment of liquid crystal molecules near the contact hole, the effect thereof on the display is small, and thereby the contrast thereof can be improved. In addition, an electric field is generated in a gap portion between the second electrode and the shield electrode so as to regulate the alignment of the liquid crystal molecules, and accordingly, an advantage equivalent to that acquired from improving the aperture ratio of the horizontal electric field-type liquid crystal display panel can be acquired. Thereby a horizontal electric field-type liquid crystal display panel that is bright and has excellent contrast is acquired.

According to a third aspect of the invention, in the above-described horizontal electric field-type liquid crystal display panel according, the first electrode is connected to the common wiring, the second electrode is connected to the switching element though a first contact hole formed on an electrode of the switching element, and the shield electrode is connected to the common wiring through a second contact hole formed on the common wiring and is connected to the first electrode of an adjacent pixel through a third contact hole formed on the first electrode of the adjacent pixel.

In the horizontal electric field-type liquid crystal display panel, the first electrode forms a common electrode and the second electrode forms a pixel electrode. According to the horizontal electric field-type liquid crystal display panel of the aspect above, the shield electrode and the first electrode can be connected together by using a simple configuration. In addition to the above-described advantages, since a plurality of the first electrodes in the direction for intersecting the scanning line are connected in series, resistance of the common wiring is substantially lowered, and thereby so-called wiring delay is shortened. Thereby, the electric potential of the first electrode is stabilized and crosstalk decreases.

According to a fourth aspect of the invention, in the above-described horizontal electric field-type liquid crystal display panel, the shield electrode is formed of a same material as that of the second electrode.

According to the horizontal electric field-type liquid crystal display panel of the aspect above, the shield electrode is formed of a same material as that of the second electrode, and accordingly, the shield electrode can be formed simultaneously with the second electrode. Therefore, man-hour particularly for forming the shield electrode is not required to be increased.

According to a fifth aspect of the invention, in the above-described horizontal electric field-type liquid crystal display panel, the first electrode is connected to the switching element though a first contact hole formed on an electrode of the switching element, and the shield electrode is formed of a same material as that of the second electrode and is formed integrally with the second electrode.

In the horizontal electric field-type liquid crystal display panel of the aspect above, the first electrode forms a pixel electrode and the second electrode forms a common electrode. According to the horizontal electric field-type liquid crystal display panel of the aspect above, the second electrode and the shield electrode are formed of a same material, and accordingly, the shield electrode portion can be formed simultaneously with the second electrode. Therefore, a horizontal electric field-type liquid crystal display panel that has a simple configuration, can be manufactured in an easy manner, and has excellent contrast can be acquired.

According to a sixth aspect of the invention, in the above-described horizontal electric field-type liquid crystal display panel, the shield electrode coats a half or more of the scanning line.

According to the horizontal electric field-type liquid crystal display panel of the aspect above, a half or more of the scanning line is coated with the shield electrode, and accordingly, the electric field caused by a high-voltage signal applied to the scanning line has little effect on the liquid crystal molecules and the second electrode, whereby it is difficult for a burn-in phenomenon to occur. When the coating range of the scanning line by using the shield electrode is less than a half, the burn-in phenomenon increases as the range of coating decreases, and the coating range less than a half is not preferential. In other words, as the coating range of the scanning line by using the shield electrode increases, the burn-in phenomenon in the horizontal electric field-type liquid crystal display panel decreases in proportion thereto.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the present invention will be described with reference to the accompanying drawings. However, the embodiments described below are examples of an FFS-mode liquid crystal display panel as a liquid crystal display panel of a horizontal electric field type for implementing the technical concept of the invention. Therefore, the embodiments are not for the purpose of limiting the scope of the invention to the FFS-mode liquid crystal display panel, and the invention may be applied to other embodiments belonging to the scope of the invention in the same manner.

Figure 1:
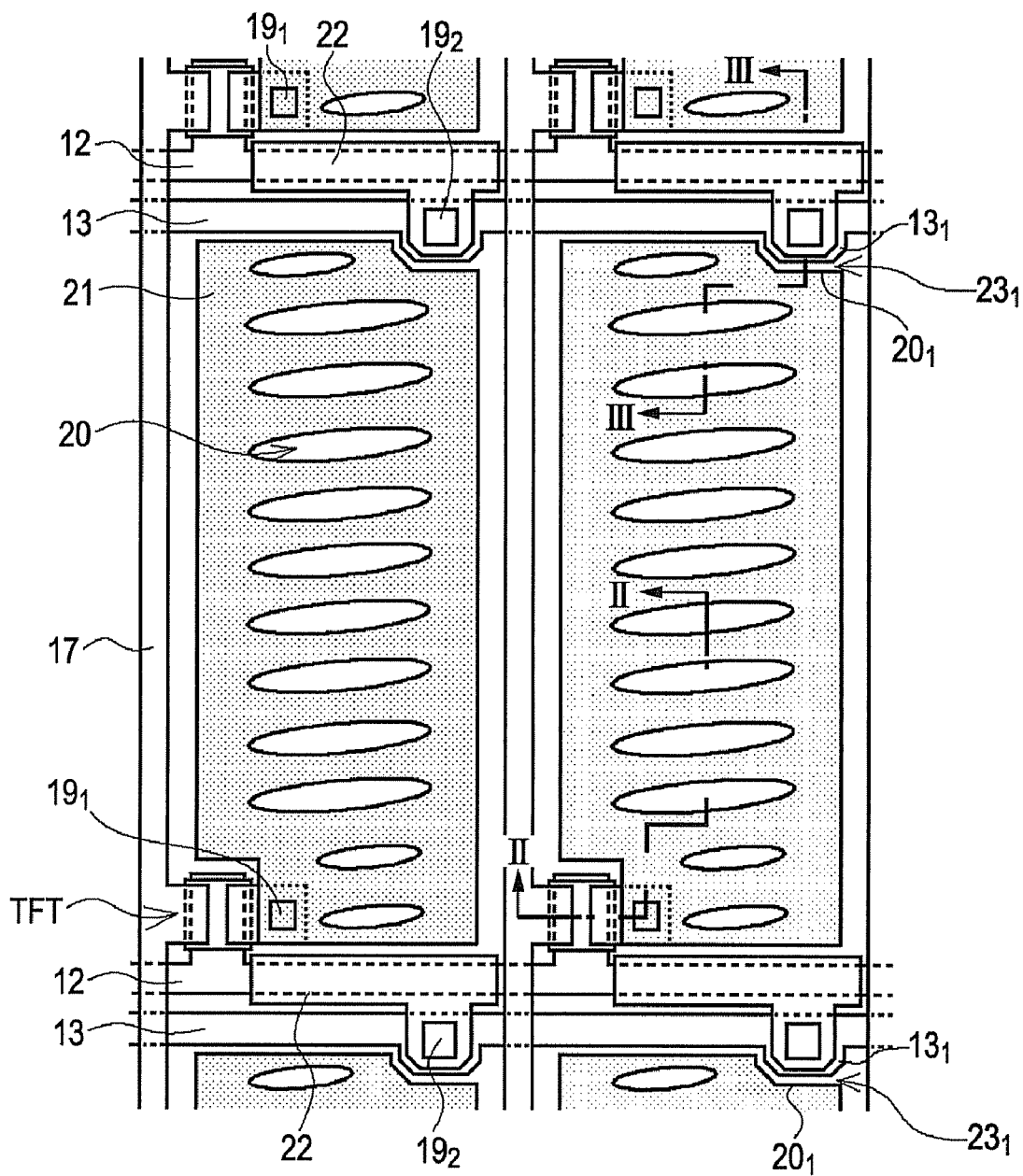
FIG. 1 is a schematic plan view of two pixels represented by seeing through a color filter substrate of an FFS mode liquid crystal display panel according to Embodiment 1 of the invention.
Figure 2:
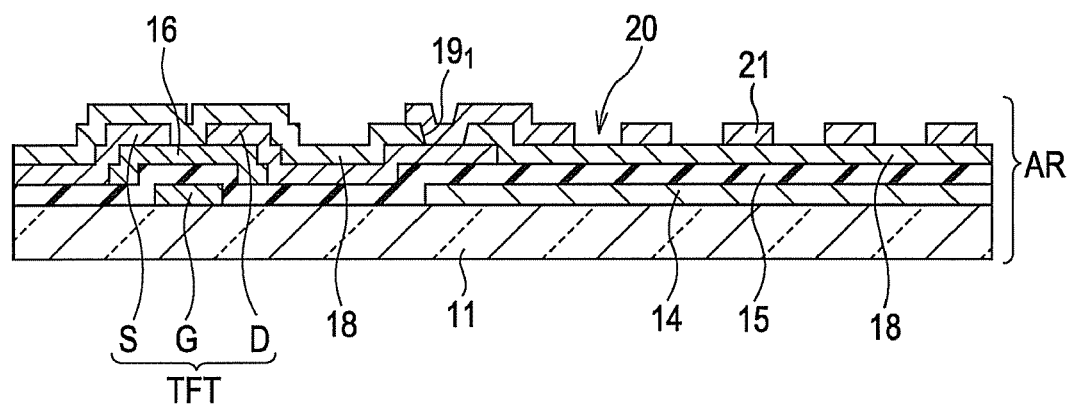
FIG. 2 is a cross-sectional view of FIG. 1 taken along line II-II.
Figure 3:
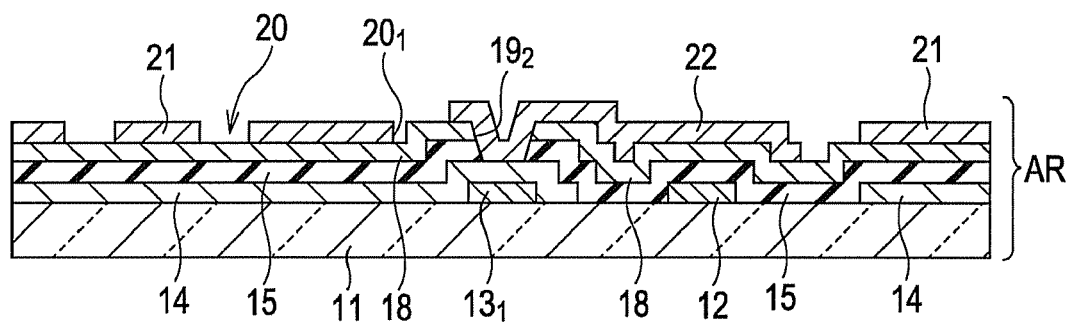
FIG. 3 is a cross-sectional view of FIG. 1 taken along line III-III.
Figure 4:
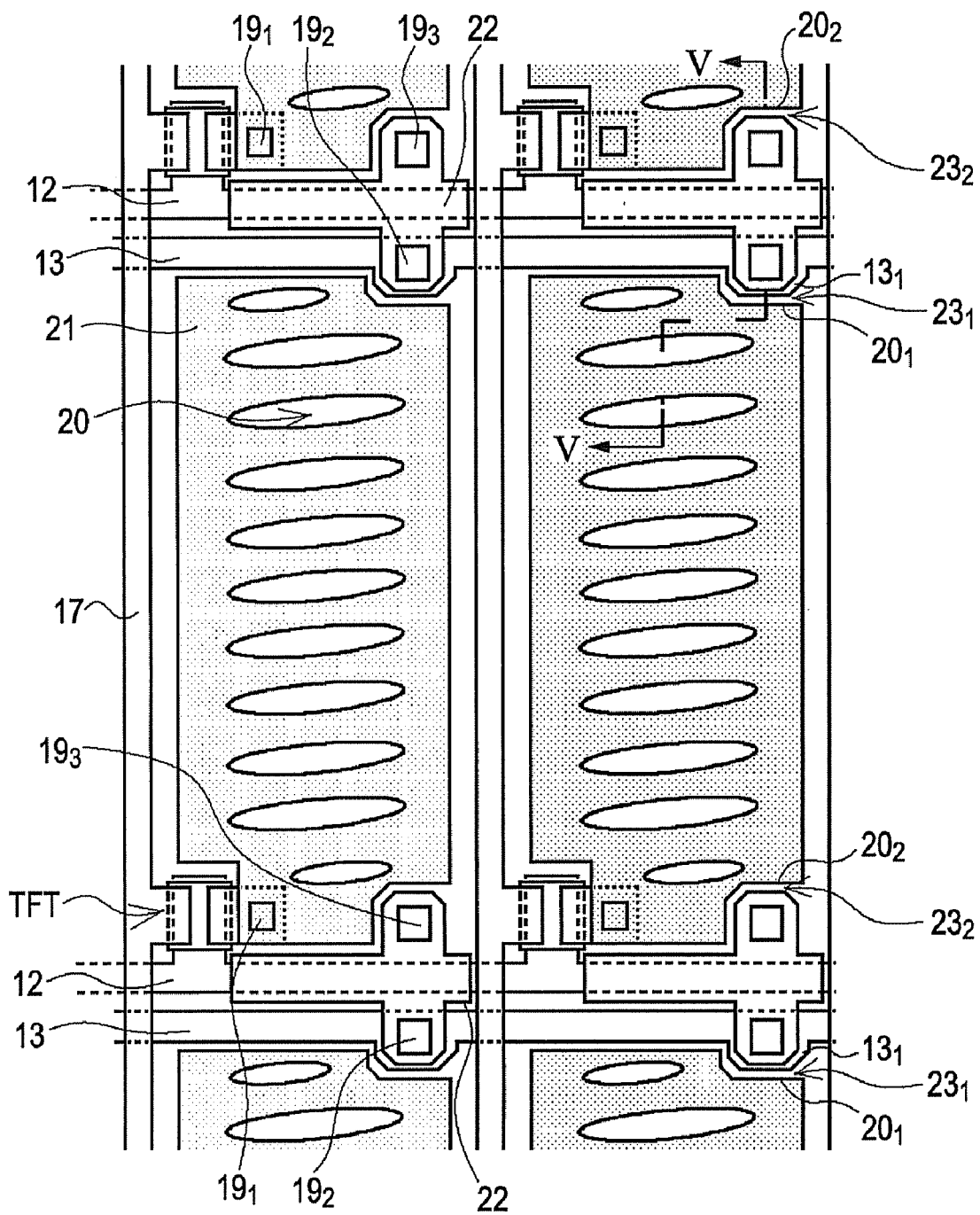
FIG. 4 is a schematic plan view of two pixels represented by seeing through a color filter substrate of an FFS mode liquid crystal display panel according to Embodiment 2 of the invention.
Figure 5:
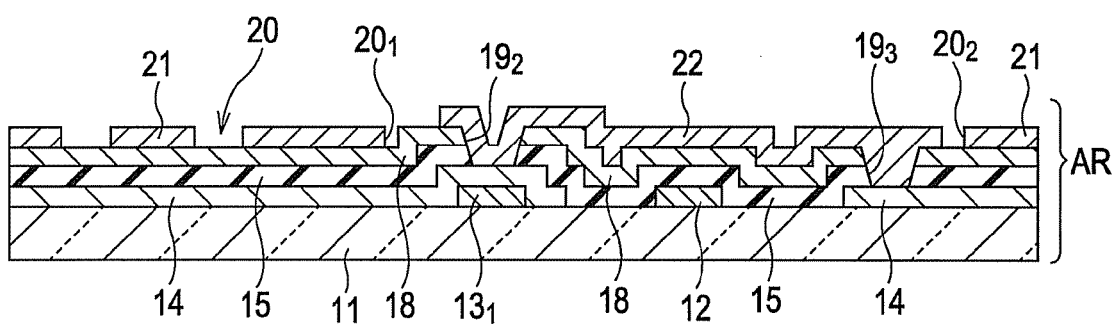
FIG. 5 is a cross-sectional view of FIG. 4 taken along line V-V.
Figure 6:
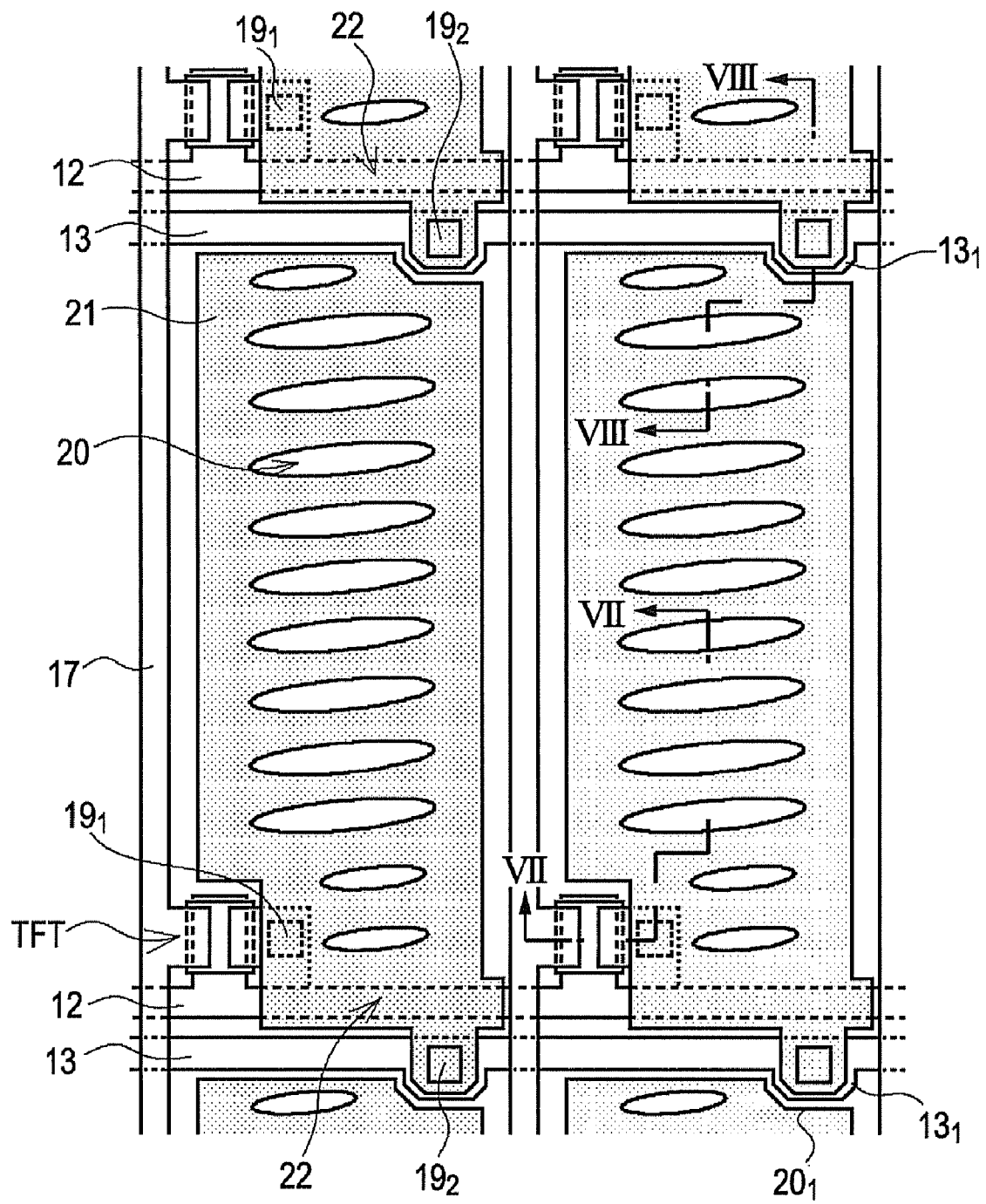
FIG. 6 is a schematic plan view of two pixels represented by seeing through a color filter substrate of an FFS mode liquid crystal display panel according to Embodiment 3 of the invention.
Figure 7:
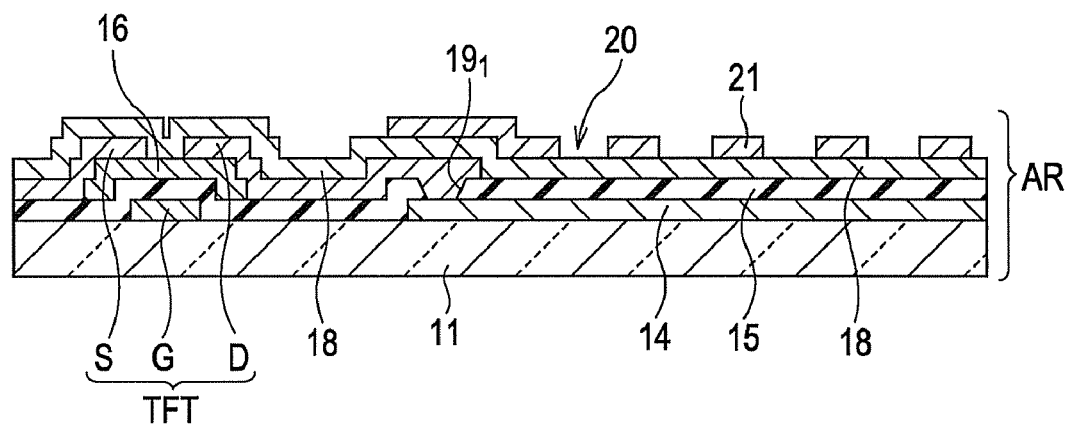
FIG. 7 is a cross-sectional view of FIG. 5 taken along line VII-VII.
Figure 8:
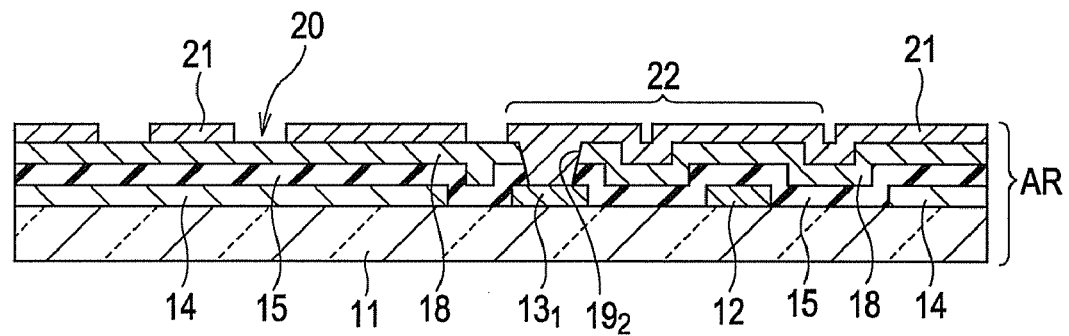
FIG. 8 is a cross-sectional view of FIG. 5 taken along line VIII-VIII.
Figure 9:
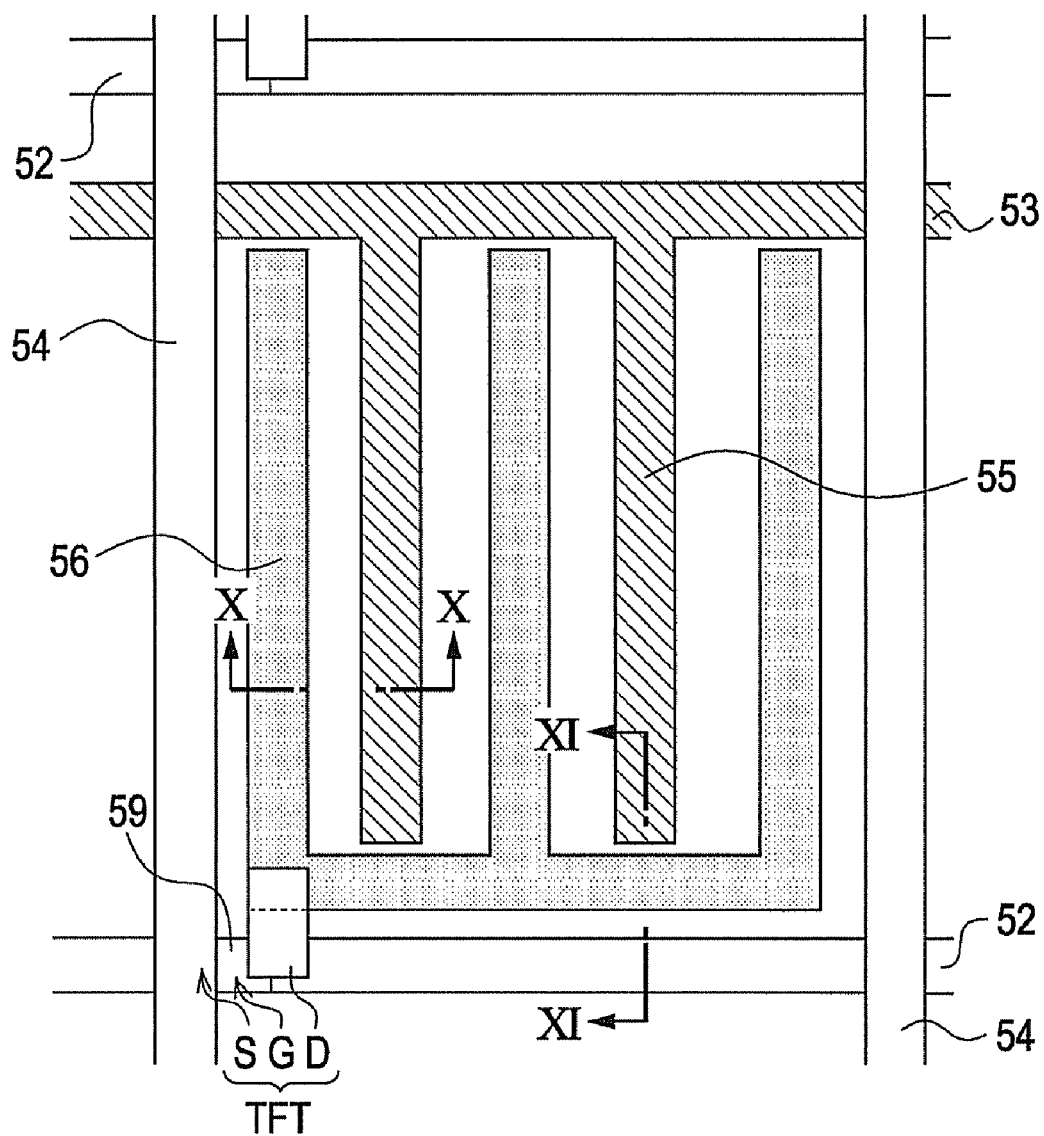
FIG. 9 is a schematic plan view of one pixel of a general liquid crystal display panel of the IPS mode as an example.
Figure 10:
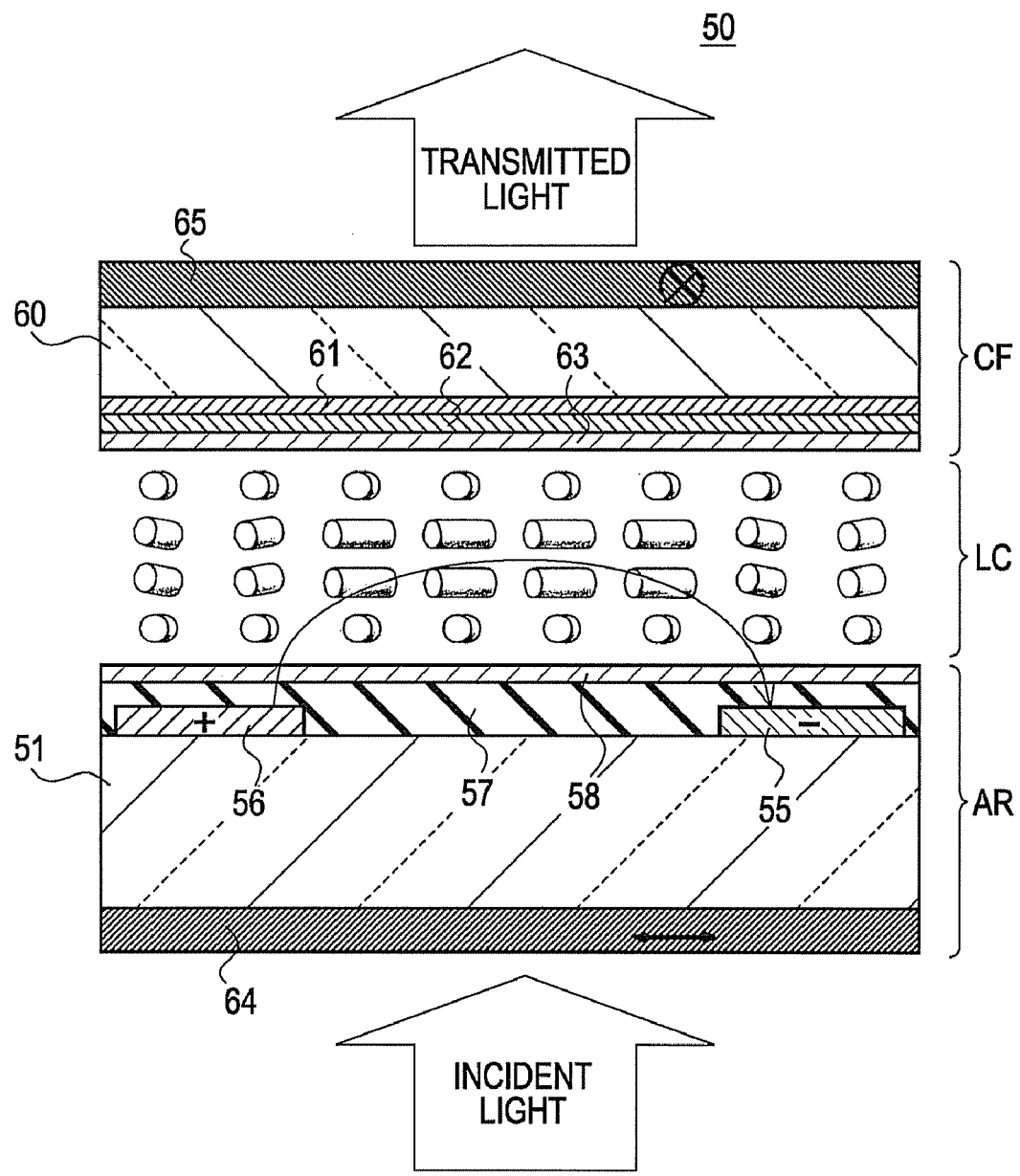
FIG. 10 is a cross-sectional view of FIG. 9 taken along line X-X.
Figure 11:
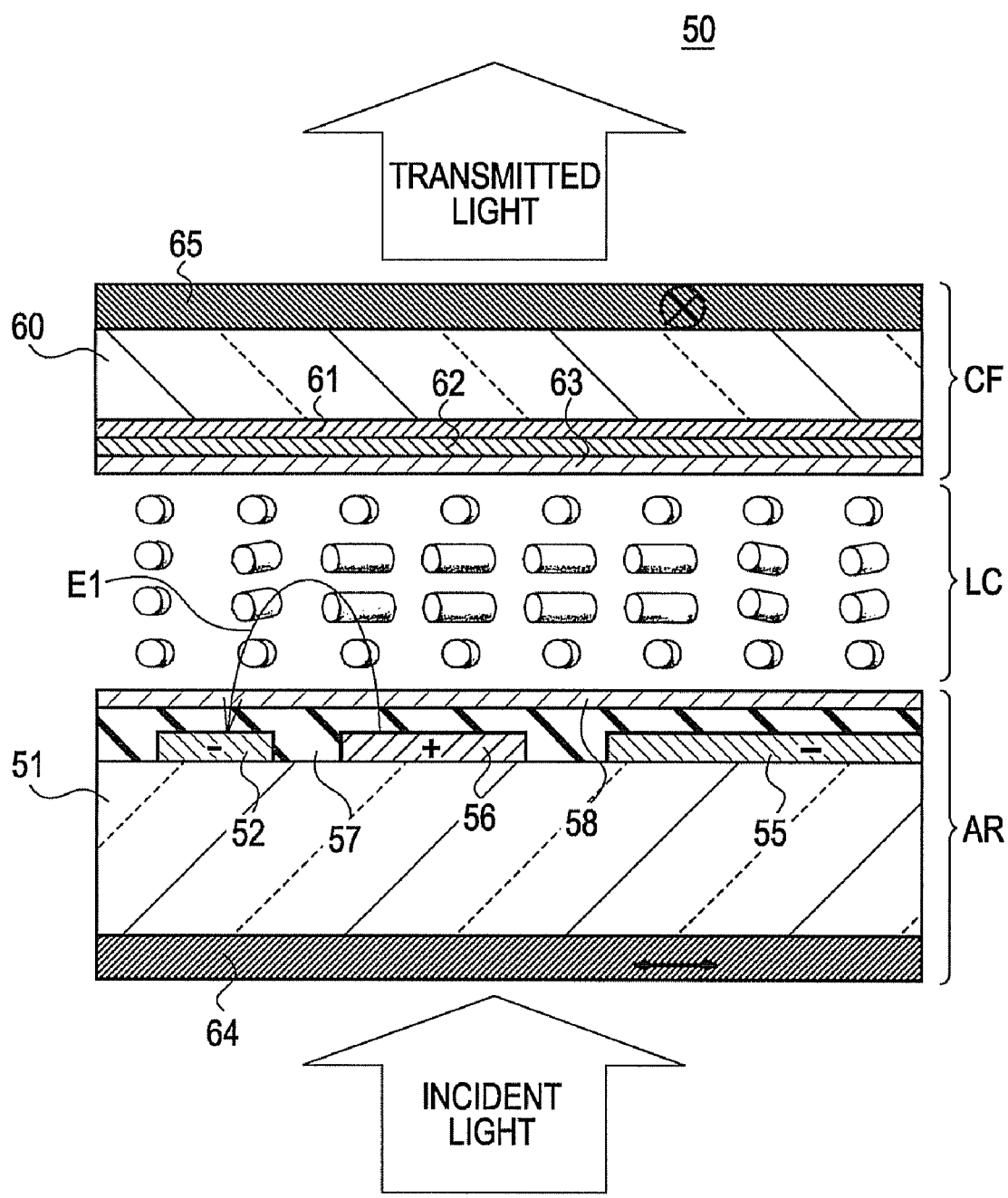
FIG. 11 is a cross-sectional view of FIG. 9 taken along line XI-XI.
Figure 12:
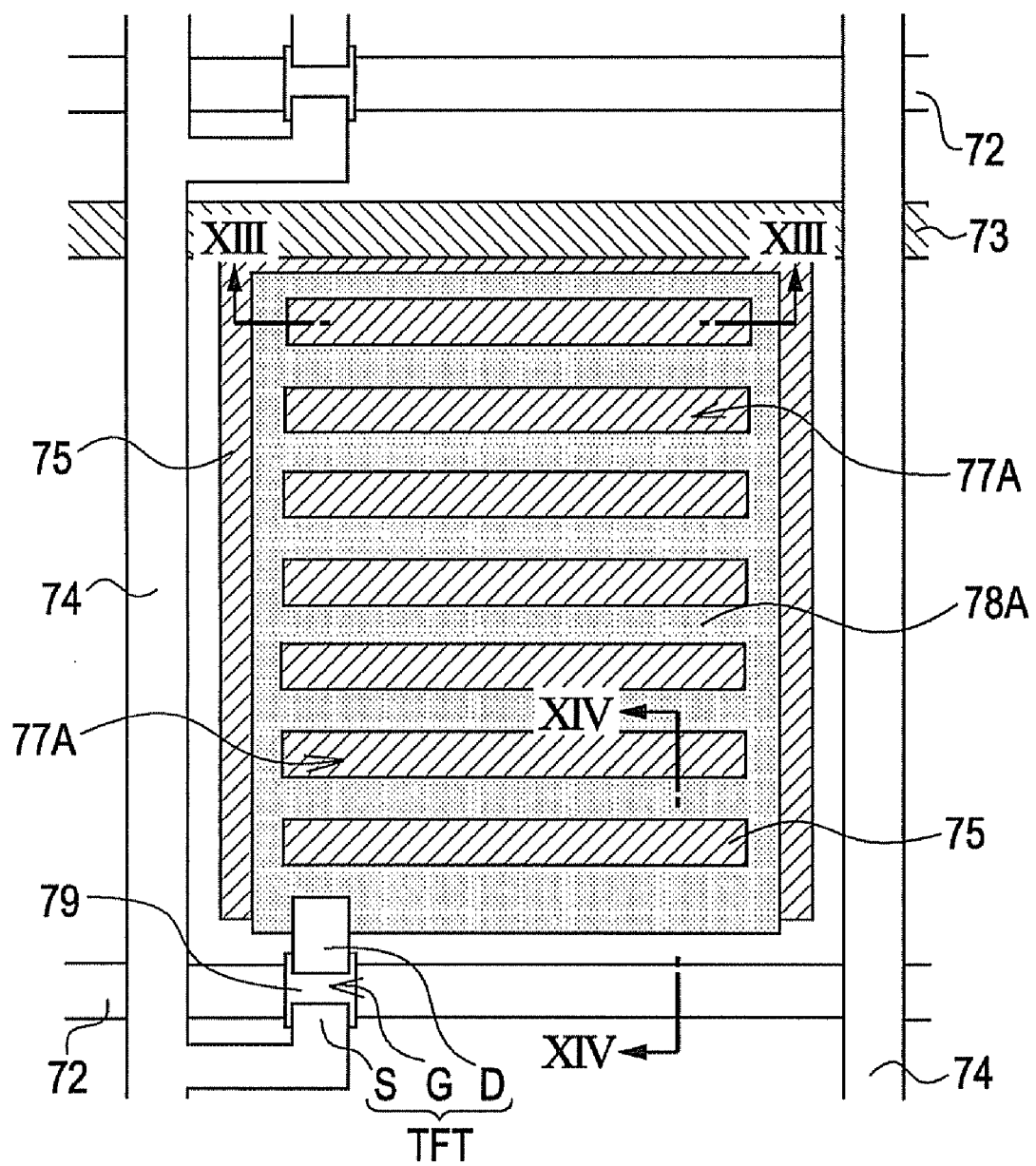
FIG. 12 is a schematic plan view of one pixel of a general liquid crystal display panel of the FFS mode as an example.
Figure 13:
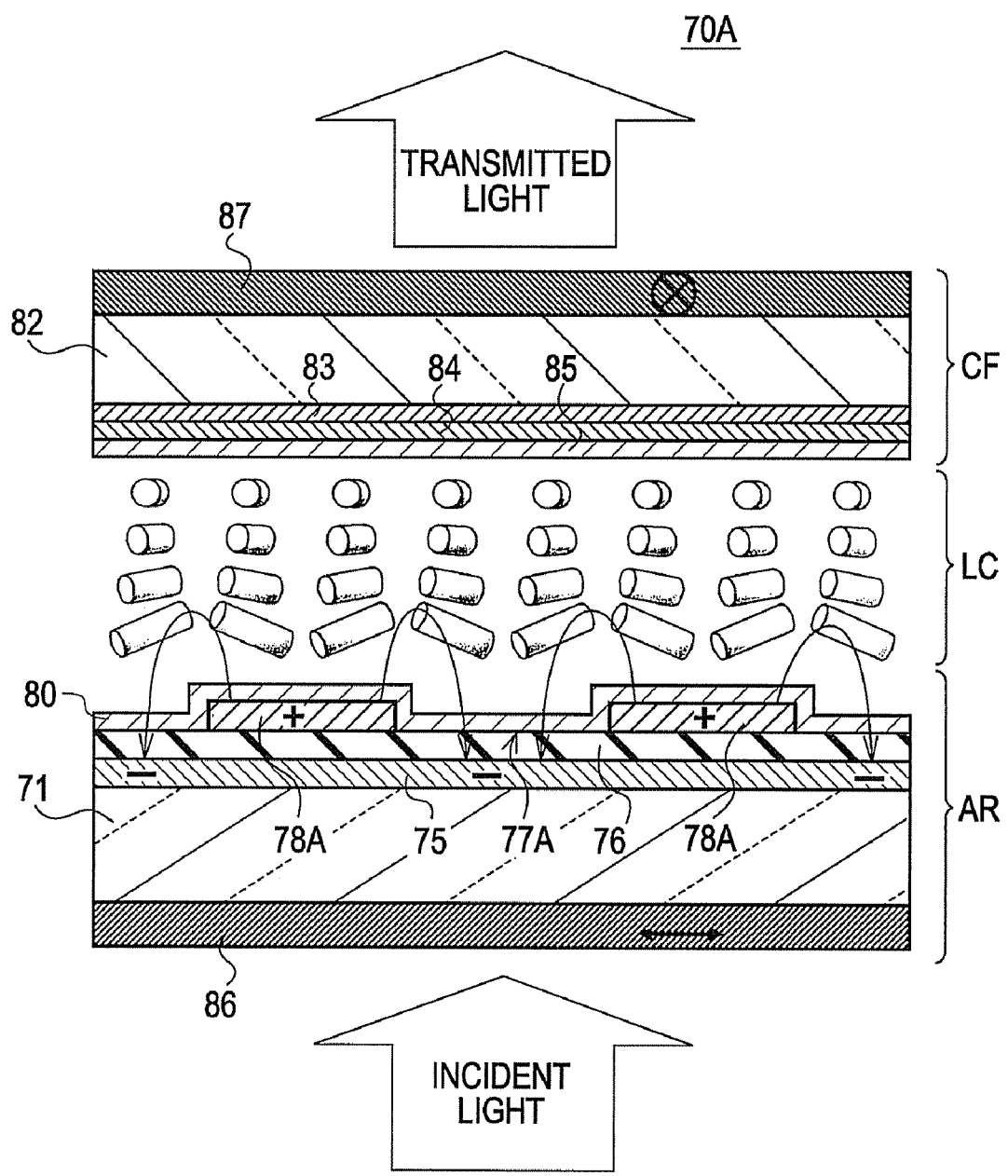
FIG. 13 is a cross-sectional view of FIG. 12 taken along line XIII-XIII.
Figure 14:
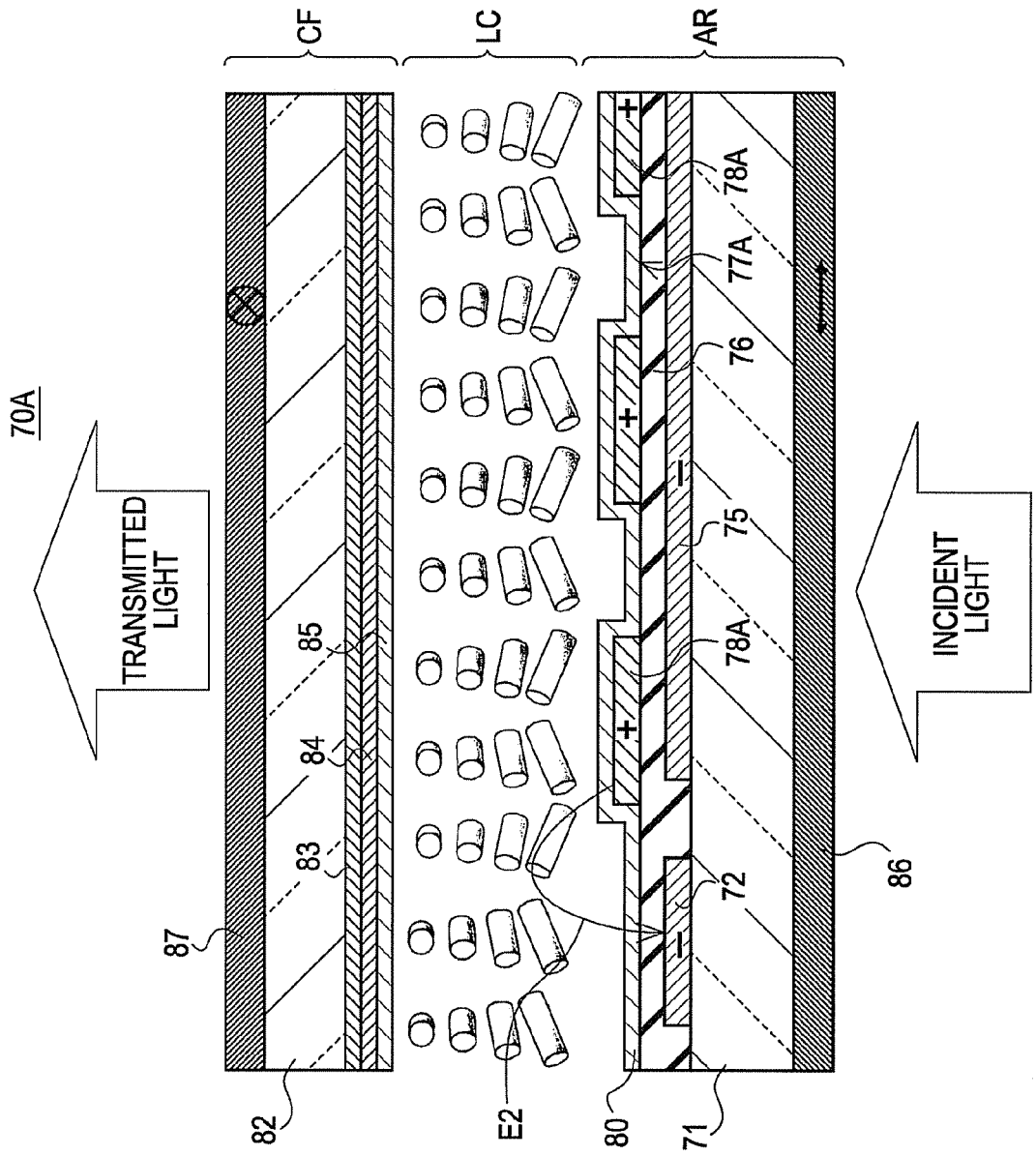
FIG. 14 is a cross-sectional view of FIG. 12 taken along line XIV-XIV.
Figure 15:
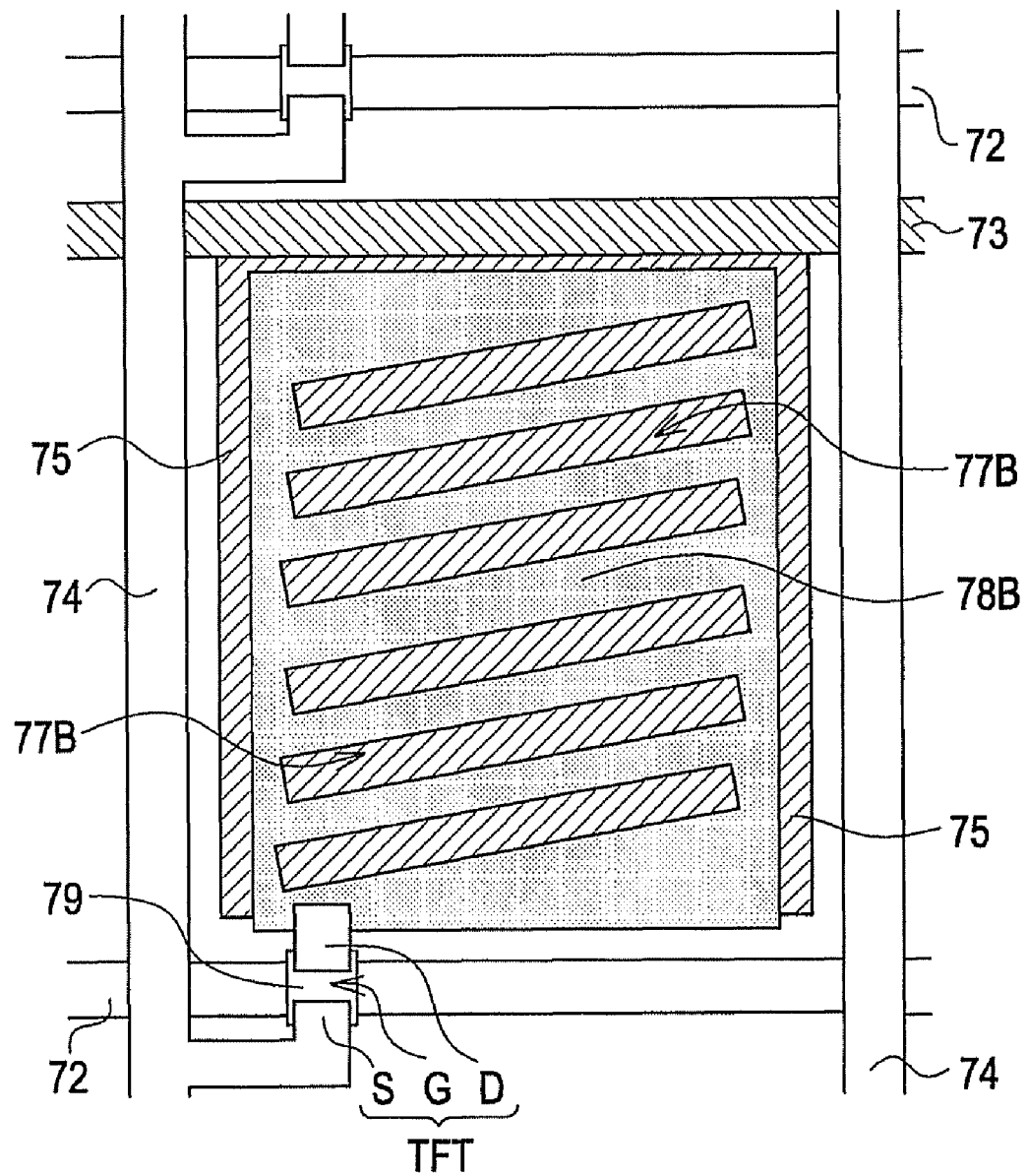
FIG. 15 is a schematic plan view of one pixel of an FFS-mode liquid crystal display panel having a structure in which slits of pixel electrodes are tilted.

FIG. 1 is a schematic plan view of two pixels represented by seeing through a color filter substrate of an FFS mode liquid crystal display panel according to Embodiment 1 of the invention. FIG. 2 is a cross-sectional view of FIG. 1 taken along line II-II. FIG. 3 is a cross-sectional view of FIG. 1 taken along line III-III. FIG. 4 is a schematic plan view of two pixels represented by seeing through a color filter substrate of an FFS mode liquid crystal display panel according to Embodiment 2 of the invention. FIG. 5 is a cross-sectional view of FIG. 4 taken along line V-V. FIG. 6 is a schematic plan view of two pixels represented by seeing through a color filter substrate of an FFS mode liquid crystal display panel according to Embodiment 3 of the invention. FIG. 7 is a cross-sectional view of FIG. 5 taken along line VII-VII. FIG. 8 is a cross-sectional view of FIG. 5 taken along line VIII-VIII.

Embodiment 1

An array substrate AR of the FFS-mode liquid crystal display panel 10A according to Embodiment 1 will be described in accordance with the order of the manufacturing process with reference to FIGS. 1 to 3. The array substrate AR of the FFS-mode liquid crystal display panel 10A according to Embodiment 1 is formed by forming a two-layer film, for example, having a lower portion made of Al metal and having a surface made of Mo metal over the whole surface of a transparent substrate 11 such as a glass substrate and then forming a plurality of scanning lines 12 and a plurality of common wirings 13, which are formed by two-layer wiring of Mo/Al, to be parallel to each other using a photolithographic method and an etching method. Aluminum has an advantage that it has small resistance. However, aluminum has a disadvantage that it has high contact resistance with ITO, IZO or the like which can be easily eroded. Thus, by using a multilayer structure in which aluminum is covered with molybdenum, such a disadvantage can be minimized. The common wirings 13 are disposed along the scanning lines 12, and a partially widened portion $13_1$ of each common wiring is formed in a contact hole forming area, to be described later, for each pixel.

According to Embodiment 1, the common wiring 13 is formed along the side of a scanning line 12 of an adjacent pixel disposed in the front end thereof. The contact hole forming portion $13_1$ is widened on the corresponding pixel side and is disposed in a position precisely symmetrical to a TFT forming position (gate electrode G) to be described later. The common wiring 13 may be disposed on the scanning line 12 side of a corresponding pixel 12, or may be disposed in a middle position between the scanning line 12 of a pixel disposed in the front end thereof and the scanning line 12 of the corresponding pixel.

Next, over the whole surface of the transparent substrate 11 in which the scanning line 12 and the common wiring 13 are formed, a transparent conductive layer, for example, formed of ITO, IZO, or the like is coated, and similarly, a first electrode 14 is formed by using a photolithographic method and an etching method. The first electrode 14 is connected to the common wiring 13, and is not connected to the scanning line 12 or the gate electrode G. Accordingly, in the FFS-mode liquid crystal display panel 10A according to Embodiment 1, the first electrode 14 serves as a common electrode. Although an example in which the first electrode 14 disposed on one side of the scanning line 12 is formed on the common wiring 13 is shown in FIG. 3, such a configuration is not necessarily used as long as the first electrode 14 and the common wiring 14 are electrically connected to each other.

In addition, a gate insulation film 15 formed of a silicon nitride layer, an silicon oxide layer, or the like is coated on this whole surface, and, for example, an amorphous silicon (hereinafter, referred to as "a-Si") layer is coated on the whole surface of the gate insulation film 15 by using a CVD method, and then, a semiconductor layer 16, for example, formed of the a-Si layer is formed in the TFT forming area by using a photolithographic method and an etching method similarly. An area of the scanning line 12 in which the semiconductor layer 16 is formed forms a gate electrode G of the TFT.

Next, a conductive layer, for example, having a three-layer structure of Mo/Al/Mo is coated on the whole surface of the transparent substrate 11 on which the semiconductor layer 16 is formed, and a signal line 17 and a drain electrode D are formed by using a photolithographic method and an etching method, similarly. As a material for forming the signal line 17 and the drain electrode D, a Ti alloy, Cr, or the like may be used. The source electrode S portion of the signal line 17 and the drain electrode D portion are partially overlapped with the surface of the semiconductor layer 16. In addition, on the whole surface of the substrate, a passivation film 18 formed of a silicon nitride layer is coated on the whole surface of the substrate.

Next, a contact hole $19_1$ is formed in a position of the passivation film 18 which corresponds to the drain electrode D so as to expose a part of the drain electrode D. In addition, a contact hole $19_2$ is formed on portions of the passivation film 18 and the gate insulation film 15 which are disposed on the partially widened portion $13_1$ of the common wiring 13 so as to expose a part of the first electrode 14 and the common wiring 13. In addition, a transparent conductive layer, for example, formed of ITO, IZO, or the like is coated on the whole surface, and a second electrode 21 and a shield electrode 22 are formed so as to form a pattern shown in FIG. 1 by using a photolithographic method and an etching method similarly. The second electrode 21 is formed so as to have a slit 20 and a notched portion $20_1$ on a portion of the passivation film 18 surrounded by the scanning line 12 and the signal line 17. In addition, the shield electrode 22 is formed so as to have a gap $23_1$ from the second electrode 21 in a part of the surface of the passivation film 18 which is disposed on the scanning line 12.

Although the slit 20 according to this embodiment which is formed on the second electrode 21 is formed to have closed both ends, the shape of the slit 20 is not limited thereto. For example, the slit may have one open side. In addition, according to Embodiment 1, although all the slits 29 are formed to be tilted in a same direction (direction toward the upper right side), the present invention is not limited thereto. For example, the second electrode 21 is divided into two areas, and it may be configured that slits in one area is formed in a direction toward the upper right side and slits in the other area is formed in a direction toward the upper left side.

The notched portion $20_1$ formed in the second electrode 21 is formed to be apart from the partially widened portion $13_1$ of the common wiring 13 so as not to be overlapped with the partially widened portion $13_1$ in a plan view. By disposing the widened portion $13_1$ in a position of a pixel to face a position (the gate electrode G) in which a TFT of the pixel is formed, the slit 20 to be formed on the second electrode 21 can be efficiently formed in the pixel.

The second electrode 21 is connected to the drain electrode D through the contact hole $19_1$ and the shield electrode 22 is connected to the first electrode 14 and the common wiring 13 through the contact hole $19_2$. Thus, in the FFS-mode liquid crystal display panel 10A according to Embodiment 1, the second electrode 21 serves as a pixel electrode. In order not to influence the operating characteristics of the TFT, it is preferable that the shield electrode 22 does not cover the surface of the semiconductor layer 16. The shield electrode 22 may be formed of a material other than the material used for forming the second electrode 21, for example, conductive metal such as aluminum.

By forming a predetermined alignment film (not shown) over the whole surface, manufacturing of the array substrate AR is completed. By disposing the array substrate AR manufactured as described above and a color filter substrate manufactured independently from the array substrate to face each other, sealing the peripheral thereof with a sealing agent, and injecting a liquid crystal into a gap between the substrates, the FFS-mode liquid crystal display panel 10A according to Embodiment 1 is acquired. Since the configuration of the color filter substrate is not substantially different from that of the above-described general example, a description thereof is omitted here.

In the FFS-mode liquid crystal display panel 10A according to Embodiment 1 which is acquired as described above, since at least a part of the scanning line 12 is coated with the conductive shield electrode 22, the liquid crystal is not driven by a DC electric field generated by a high-voltage signal applied to the scanning line 12, and accordingly, the contrast thereof is improved. In addition, the second electrode 21 and the alignment film disposed on the surface thereof are not influenced by an irreversible effect due to the DC electric field from the scanning line 12, and accordingly, the burn-in phenomenon of the FFS-mode liquid crystal display panel 10A is reduced markedly. The contact hole $19_2$ used for connecting the shield electrode 22 to the first electrode 14 and the common wiring 13 may be formed simultaneously with the contact hole $19_1$ used for connecting the drain electrode D of the TFT and the first electrode 18 together. In such a case, manhour particularly for forming the contact hole $19_2$ for the shield electrode 22 does not increase.

For applying the voltage applied to the common wiring 13 to the shield electrode 22, when the shield electrode 22 is connected to the common wiring through an area in which the first electrode 18 is formed, an area of the first electrode which cannot be used effectively for display increases. However, when the shield electrode is connected to the common wiring through the contact hole $19_2$ formed on the common wiring 13, an area that is not originally used for display can be used, and thereby a large display area can be acquired. In addition, even when there is disturbance in the alignment of liquid crystal molecules near the contact hole $19_2$ light is shielded by the common wiring 13, and thereby the contrast thereof can be improved.

In addition, although a gap $23_1$ is formed between the shield electrode 22 and the second electrode 21, the shield electrode 22 is connected to the common wiring 13, and thus an electric field is generated in the gap $23_1$ and thereby the alignment of the liquid crystal molecules is regulated. Accordingly, in the FFS-mode liquid display panel 10A according to Embodiment 1, there is an advantage equivalent to that acquired from improving the aperture ratio of the horizontal electric field-type liquid crystal display panel, and thereby a bright display image is acquired. When the alignment of the liquid crystal molecules in the gap $23_1$ is not required to contribute to display, the widened portion $13_1$ of the common wiring 13 may be formed large so as to shield light.

Embodiment 2

An FFS-mode liquid crystal display panel 10B according to Embodiment 2 will be described in accordance with the order of the manufacturing process with reference to FIGS. 4 and 5. In FIGS. 4 and 5, to a same constituent part as that of the FFS-mode liquid crystal display panel 10A according to Embodiment 1 shown in FIGS. 1 to 3, a same reference numeral is assigned for description. Since a cross-sectional view of a portion of the liquid crystal display panel 10B according to Embodiment 2 which corresponds to line II-II shown in FIG. 1 is substantially the same as FIG. 2, a description will be made with reference to FIG. 2, as is needed.

An array substrate AR of the FFS-mode liquid crystal display panel 10B according to Embodiment 2 is formed by forming a two-layer film, for example, having a lower portion made of aluminum metal Al and having a surface made of molybdenum metal Mo over the whole surface of a transparent substrate 11 such as a glass substrate and then forming a plurality of scanning lines 12 and a plurality of common wirings, which are formed by two-layer wiring of Mo/Al, to be parallel to each other using a photolithographic method and an etching method. The common wirings 13 are disposed along the scanning lines 12, and a partially widened portion $13_1$ of each common wiring is formed in a contact hole forming area, to be described later, for each pixel.

Next, over the whole surface of the transparent substrate 11 in which the scanning line 12 and the common wiring 13 are formed, a transparent conductive layer, for example, formed of ITO, IZO, or the like is coated, and similarly, a first electrode 14 is formed by using a photolithographic method and an etching method. The first electrode 14 is connected to the common wiring 13, and is not connected to the scanning line 12 or the gate electrode G. Although an example in which the first electrode 14 disposed on one side of the scanning line 12 is formed on the common wiring 13 is shown in FIG. 5, such a configuration is not necessarily used. Accordingly, in the FFS-mode liquid crystal display panel 10B according to Embodiment 2, the first electrode 14 serves as a common electrode.

In addition, a gate insulation film 15 formed of a silicon nitride layer, an silicon oxide layer, or the like is coated on this whole surface, and, for example, an a-Si layer is coated on the whole surface of the gate insulation film 15 by using a CVD method, and then, a semiconductor layer 16 formed of the a-Si layer is formed in the TFT forming area by using a photolithographic method and an etching method similarly. An area of the scanning line 12 in which the semiconductor layer 16 is formed forms a gate electrode G of the TFT.

Next, a conductive layer, for example, having a three-layer structure of Mo/Al/Mo is coated on the whole surface of the transparent substrate 11 on which the semiconductor layer 16 is formed, and a signal line 17 having a source electrode S portion and a drain electrode D are formed by using a photolithographic method and an etching method, similarly. The source electrode S portion of the signal line 17 and the drain electrode D portion are partially overlapped with the surface of the semiconductor layer 16. In addition, on the whole surface of the substrate, a passivation film 18 formed of a silicon nitride layer is coated on the whole surface of the substrate.

Next, a contact hole $19_1$ is formed in a position of the passivation film 18 which corresponds to the drain electrode D so as to expose a part of the drain electrode D. In addition, contact holes $19_2$ and $19_3$ are formed in portions of the passivation film 18 and the gate insulation film 15 which correspond to notched portions $20_1$ and $20_2$ of a second electrode to be described later, and thereby parts of the first electrode 14 on both sides interposing the scanning line 12 therebetween are exposed. In addition, a transparent conductive layer, for example, formed of ITO, IZO, or the like is coated over the whole surface, and the second electrode 21 and a shield electrode 22 are formed so as to form a pattern shown in FIG. 4 by using a photolithographic method and an etching method. The second electrode 21 is formed so as to have a slit 20 on an area of a passivation film 18 which is surrounded by the scanning line 12 and the signal line 17 and notched portions $20_1$ and $20_2$ on corner portions of the scanning line 12 on sides adjacent to both sides of the scanning line 12. In addition, the shield electrode 22 is formed so as to have gaps $23_1$ and $23_2$ from the second electrodes 21 over the notched portions $20_1$ and $20_2$ on both sides from the surface of the scanning line 12.

The second electrode 21 is connected to the drain electrode D through the contact hole $19_1$, and the shield electrode 22 is connected to the first electrode 14 on both sides of the scanning line 12 through the contact holes $19_2$ and $19_3$. Thus, in the FFS-mode liquid crystal display panel 10B according to Embodiment 2, the second electrode 21 serves as a pixel electrode, and the first electrode 14 on both sides of the scanning line 12 is connected to the shield electrode 22 through the scanning line 12. In this case, in order not to influence the operating characteristics of the TFT, it is preferable that the shield electrode 22 does not cover the surface of the semiconductor layer 16. The shield electrode 22 may be formed of a material other than the material used for forming the second electrode 21, for example, conductive metal such as aluminum.

By forming a predetermined alignment film (not shown) over the whole surface, manufacturing of the array substrate AR is completed. By disposing the array substrate AR manufactured as described above and a color filter substrate manufactured independently from the array substrate to face each other, sealing the peripheral thereof with a sealing agent, and injecting a liquid crystal into a gap between the substrates, the FFS-mode liquid crystal display panel 10B according to Embodiment 2 is acquired. Since the configuration of the color filter substrate is not substantially different from that of the above-described general example, a description thereof is omitted here.

In the FFS-mode liquid crystal display panel 10B according to Embodiment 2 which is acquired as described above, since at least a part of the scanning line 12 is coated with the conductive shield electrode 22, the liquid crystal is not driven by a DC electric field generated by a high-voltage signal applied to the scanning line 12, and accordingly, the contrast thereof is improved. In addition, the second electrode and the alignment film disposed on the surface thereof are not influenced by an irreversible effect due to the DC electric field from the scanning line 12, and accordingly, the burn-in phenomenon of the FFS-mode liquid crystal display panel 10B is reduced markedly. In addition, the contact hole $19_2$ used for connecting the shield electrode 22 to the first electrode 14 and the common wiring 13 and the contact hole $19_3$ used for connecting the shield electrode 22 to the first electrode 14 on the opposite side from the contact hole 192 through the shield electrode 22 and the scanning line 12 can be formed simultaneously with the contact hole $19_1$ for connecting the drain electrode D of the TFT and the first electrode 18 together.

Therefore, man-hour particularly for forming the contact holes $19_2$ and $19_3$ for the shield electrode 22 does not increase.

Since the shield electrode 22 is connected to the first electrode 14 disposed on both sides of the scanning line 12 though the contact holes $19_2$ and $19_3$, a plurality of the first electrodes 14 disposed in the direction for intersecting the scan lines is in a state that they are connected in series. Accordingly, in the FFS-mode liquid crystal display panel 10B according to Embodiment 2, substantial resistance of the common wiring decreases, and thus so-called a wiring delay decreases, and therefore the electric potential of the first electrode 14 is stabilized and crosstalk decreases. In addition, since the electric potential of the first electrode 14 is stabilized, it is difficult to be influenced by an external electric field.

In addition, in the FFS-mode liquid crystal display panel 10B, although gaps $23_1$ and $23_2$ are formed between the second electrode 21 and the shield electrode 22 in the notched portions $20_1$ and $20_2$, the shield electrode 22 is connected to the common wiring 13, and thus electric fields are generated in the gaps $23_1$ and $23_2$. As a result, the alignment of the liquid crystal molecules is regulated. Accordingly, in the FFS-mode liquid display panel 10B according to Embodiment 2, an advantage equivalent to that acquired from disposing slits 20 in the second electrode 21 can be acquired from the gaps $23_1$ and $23_2$. Thereby portions of the gaps $23_1$ and $23_2$ become additional effective display areas, and thus, according to the FFS-mode liquid crystal display panel 10B of Embodiment 2, an advantage equivalent to that acquired from improving the aperture ratio of the horizontal electric field-type liquid crystal display panel is acquired, and a bright display image is acquired.

Embodiment 3

An FFS-mode liquid crystal display panel 10C according to Embodiment 3 will be described in accordance with the order of the manufacturing process with reference to FIGS. 6 to 8. In FIGS. 6 and 8, to a same constituent part as that of the FFS-mode liquid crystal display panel 10A according to Embodiment 1 shown in FIGS. 1 to 3, a same reference numeral is assigned for description.

An array substrate AR of the FFS-mode liquid crystal display panel 10C according to Embodiment 3 is formed by forming a two-layer film, for example, having a lower portion made of aluminum metal Al and having a surface made of molybdenum metal Mo over the whole surface of a transparent substrate 11 such as a glass substrate and then forming a plurality of scanning lines 12 and a plurality of common wirings, which are made of two-layer wiring of Mo/Al, to be parallel to each other using a photolithographic method and an etching method. The common wirings 13 are disposed along the scanning lines 12, and a partially widened portion $13_1$ of each common wiring is formed in a contact hole forming area, to be described later, for each pixel.

Next, over the whole surface of the transparent substrate 11 in which the scanning line 12 and the common wiring 13 are formed, a transparent conductive layer, for example, formed of ITO, IZO, or the like is coated, and similarly, a first electrode 14 is formed by using a photolithographic method and an etching method. The first electrode 14 is not connected to the common wiring 13, unlike those in the FFS-mode liquid crystal display panels 10A and 10B according to Embodiments 1 and 2, and is not connected to the scanning line 12 or the gate electrode G.

In addition, a gate insulation film 15 formed of a silicon nitride layer, an silicon oxide layer, or the like is coated on this whole surface, and, for example, an a-Si layer is coated on the whole surface of the gate insulation film 15 by using a CVD method, and then, a semiconductor layer 16 formed of the a-Si layer is formed in the TFT forming area by using a photolithographic method and an etching method similarly. An area of the scanning line 12 in which the semiconductor layer 16 is formed forms a gate electrode G of the TFT. Next, a first contact hole $19_1$ is formed in a connection portion between a drain electrode D of a TFT, to be described later, of the gate insulation film 15 and the first electrode.

Next, a conductive layer, for example, having a three-layer structure of Mo/Al/Mo is coated on the whole surface of the transparent substrate 11 in which the contact hole $19_1$ is formed, and a signal line 17 having a source electrode S portion and a drain electrode D are formed by using a photolithographic method and an etching method, similarly. Both the source electrode S portion of the signal line 17 and the drain electrode D portion are partially overlapped with the surface of the semiconductor layer 16. In addition, the drain electrode D is connected to the first electrode 14 through the first contact hole $19_1$. Accordingly, in the FFS-mode liquid crystal display panel 10C according to Embodiment 3, the first electrode 14 serves as a pixel electrode. In addition, on the whole surface of the substrate, a passivation film 18 formed of a silicon nitride layer is coated on the whole surface of the substrate.

Next, a contact hole $19_2$ is formed in portions of the passivation film 18 and the gate insulation film 15 which are disposed on the partially widened portion $13_1$ of the common wiring 13 so as to expose a part of the common wiring 13. In addition, a transparent conductive layer, for example, formed of ITO, IZO, or the like is coated on the whole surface, and a second electrode 21 is formed so as to form a pattern shown in FIG. 6 by using a photolithographic method and an etching method. The second electrode 21 is formed so as to have a slit 20 and a notched portion $20_1$ on a portion of the passivation film 18 surrounded by the scanning line 12 and the signal line 17. In addition, the second electrode 21 extends so as to coat at least a part of the surface of the passivation film 18 disposed on the scanning line 12 and is connected to the partially widened portion $13_1$ of the common wiring 13 through the second contact hole $19_2$. Consequently, in the FFS-mode liquid crystal display panel 10C according to Embodiment 3, the second electrode 21 serves as a common electrode, and a portion of the second electrode 21 which is positioned on the scanning line 12 serves as the shield electrode 22 additionally.

By forming a predetermined alignment film 24 over the whole surface, manufacturing of the array substrate AR of the FFS-mode liquid crystal display panel 10C according to Embodiment 3 is completed. By disposing the array substrate AR manufactured as described above and a color filter substrate manufactured independently from the array substrate to face each other, sealing the peripheral thereof with a sealing agent, and injecting a liquid crystal into a gap between the substrates, the FFS-mode liquid crystal display panel 10C according to Embodiment 3 is acquired. Since the configuration of the color filter substrate is not substantially different from that of the above-described general example, a description thereof is omitted here.

In the FFS-mode liquid crystal display panel 10C according to Embodiment 3 which is acquired as described above, since the second electrode 21 that coats at least a part of the surface of the scanning line 12 is configured to serve as the shield electrode 22 additionally, the liquid crystal is not driven by a DC electric field generated by a high-voltage signal applied to the scanning line 12, and accordingly, the contrast thereof is improved. In addition, the second electrode 21 and the alignment film disposed on the surface thereof are not influenced by an irreversible effect due to the DC electric field from the scanning line 12, and accordingly, the burn-in phenomenon of the FFS-mode liquid crystal display panel 10C according to Embodiment 3 is reduced markedly.

What is claimed is:

1. A horizontal electric field-type liquid crystal display panel comprising:
   a plurality of scanning lines and common wirings that are disposed parallel to each other;
   a plurality of signal lines that is disposed in a direction for intersecting the plurality of scanning lines;
   a switching element that is disposed near an intersection between the scanning line and the signal line;
   a first electrode formed in an area partitioned by the scanning line and the signal line; and
   a second electrode that is formed to be overlapped with the first electrode though an insulation film disposed on the first electrode and has a plurality of slits in the shape of a stripe,
   wherein a shield electrode formed of a conductive material is formed on the surface of the insulation film disposed on the scanning line, and
   wherein the shield electrode is connected to the common wiring through a contact hole formed on the common wiring.

2. The horizontal electric field-type liquid crystal display panel according to claim 1,
   wherein the first electrodes is connected to the common wiring,
   wherein the second electrode is connected to the switching element though a first contact hole formed on an electrode of the switching element, and
   wherein the shield electrode is connected to the common wiring through a second contact hole formed on the common wiring.

3. The horizontal electric field-type liquid crystal display panel according to claim 1,
   wherein the first electrode is connected to the common wiring,
   wherein the second electrode is connected to the switching element though a first contact hole formed on an electrode of the switching element, and
   wherein the shield electrode is connected to the common wiring through a second contact hole formed on the common wiring and is connected to the first electrode of an adjacent pixel through a third contact hole formed on the first electrode of the adjacent pixel.

4. The horizontal electric field-type liquid crystal display panel according to claim 1, wherein the shield electrode is formed of a same material as that of the second electrode.

5. The horizontal electric field-type liquid crystal display panel according to claim 1,
   wherein the first electrode is connected to the switching element though a first contact hole formed on an electrode of the switching element, and
   wherein the shield electrode is formed of a same material as that of the second electrode and is formed integrally with the second electrode.

6. The horizontal electric field-type liquid crystal display panel according to claim 1, wherein the shield electrode coats a half or more of the scanning line.

* * * * *